US007979437B2

(12) United States Patent
Shin

(10) Patent No.: US 7,979,437 B2
(45) Date of Patent: *Jul. 12, 2011

(54) METHOD OF SEARCHING AN INDEX STRUCTURE FOR TV-ANYTIME FORUM METADATA HAVING LOCATION INFORMATION EXPRESSED AS A CODE FOR DEFINING A KEY

(75) Inventor: Hyoseop Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

This patent is subject to a terminal disclaimer.

(21) Appl. No.: 10/845,330

(22) Filed: May 14, 2004

(65) Prior Publication Data

US 2004/0210572 A1 Oct. 21, 2004

Related U.S. Application Data

(63) Continuation of application No. 10/623,621, filed on Jul. 22, 2003, now abandoned.

(30) Foreign Application Priority Data

Jul. 23, 2002 (KR) ........................ 10-2002-0043097
Oct. 15, 2002 (KR) ........................ 10-2002-0062913

(51) Int. Cl.
*G06F 7/00* (2006.01)
*G06F 17/30* (2006.01)

(52) U.S. Cl. ....................................... 707/741; 707/793

(58) Field of Classification Search .............. 707/3, 100, 707/741, 793
See application file for complete search history.

(56) References Cited

U.S. PATENT DOCUMENTS

| 5,655,117 | A | * | 8/1997 | Goldberg et al. ............. 707/102 |
| 5,666,442 | A | * | 9/1997 | Wheeler ....................... 382/209 |
| 5,821,934 | A | * | 10/1998 | Kodosky et al. ............. 715/763 |
| 6,263,313 | B1 | | 7/2001 | Milsted et al. |
| 6,823,329 | B2 | * | 11/2004 | Kirk et al. ......................... 707/2 |
| 2002/0088010 | A1 | | 7/2002 | Dudkiewicz et al. |
| 2002/0123928 | A1 | * | 9/2002 | Eldering et al. ................ 705/14 |
| 2002/0174147 | A1 | * | 11/2002 | Wang et al. .................... 707/513 |
| 2002/0184195 | A1 | * | 12/2002 | Qian ................................ 707/3 |
| 2004/0028049 | A1 | * | 2/2004 | Wan .............................. 370/394 |

FOREIGN PATENT DOCUMENTS

JP 2000099351 A 4/2000

(Continued)

OTHER PUBLICATIONS

Hubbard, John R. Programming with C++, Second Edition. © 1996, 2000. p. 219.*

(Continued)

*Primary Examiner* — Charles E Lu
(74) *Attorney, Agent, or Firm* — Sughrue Mion, PLLC

(57) ABSTRACT

An index structure of metadata provided for searching for information on contents, a method for providing indices of the metadata, and a method and an apparatus for searching for the metadata using the index structure of the metadata are provided. The index structure of the metadata includes a list of keys corresponding to fields of the metadata, and location information for defining a key, wherein at least a part of the location information is expressed as a predetermined code.

26 Claims, 12 Drawing Sheets

FOREIGN PATENT DOCUMENTS

JP  2001-229060  8/2001

OTHER PUBLICATIONS

Pershikov, V.I., et al. "Tolkovy Slovar po Informatike" (The Explanatory Dictionary of Informatics), Moscow, Finances and Statistics Publishing House, 1998, p. 188, right column, 2 pages.

J. P. Evain: "1st Draft of Metadata Specification SP003v1.3" The TV Anytime Forum, 'Online! Jun. 11, 2002, XP002323574; 20 pages.

C.E. Dyreson et al.: "MetaXPath" Proceedings of the 2001 International Conference on Dublin Core and Metadata Applications, 'Online! Oct. 22, 2001, Oct. 26, 2001 XP002324400; 7 pages.

"Specification Series S-3 on: Metadata (Normative) Part: A Metadata Schemes" The TV Anytime Forum, 'Online! Jun. 28, 2002, XP002323575, 81 pages.

The TV-Anytime Forum; Specification Series: S-3 On: Metadata (Normative) Part B: System Aspects in a Unidirectional Environment; Document: SP003v1.2 Part B Provisional Specification Date: Apr. 5, 2002, 33 pages.

SP—3V1.3 Part B—System issued, 20 pages.

Office Action dated Mar. 18, 2008 in Japanese Patent Application No. 2005-025701.

* cited by examiner

METHOD OF SEARCHING AN INDEX STRUCTURE FOR TV-ANYTIME FORUM METADATA HAVING LOCATION INFORMATION EXPRESSED AS A CODE FOR DEFINING A KEY

CROSS-REFERENCE TO RELATED APPLICATIONS

This is a continuation of U.S. patent application Ser. No. 10/623,621 filed Jul. 22, 2003 now abandoned, the disclosure of which is incorporated herein by reference. The present application is based on and claims the benefit of Korean Patent Application Nos. 2002-43097 and 2002-62913, which are incorporated herein by reference.

BACKGROUND OF THE INVENTION

1. Field of the Invention

The present invention relates to an index structure of metadata provided for searching for information on contents and a method for providing indices of the metadata, and a method and an apparatus for searching for the metadata using the index structure of the metadata. More particularly, the present invention relates to an index structure of metadata containing information on a key, at least a part of which is encoded so as to allow information on contents to be more efficiently searched when the XML metadata for the digital contents defined in TV-Anytime Forum (hereinafter referred to as "TVA") (hereinafter referred to as "TVA metadata") is divided into fragments in an independent unit and transmitted on a fragment basis, a method for providing indices of the metadata, and a method and an apparatus for searching the metadata using the indices of metadata.

2. Description of the Related Art

The TV-Anytime Forum is a private standardization organization established in September 1999 with the purpose of developing standards for providing audiovisual related services in a user-friendly environment such as a personal digital recorder (PDR) having a high volume personal storage device. Specifically, the aim of the services is to enable all the users to view and listen to various types of programs (such as conventional broadcasting services, online interactive services and the like) at a desired time and in a desired manner based on the personal storage device.

The TV-Anytime Forum has operated Working Groups for business models, system/transmission interfaces/contents referencing, descriptions, metadata, rights management and protection and the like, in order to establish standardization. With respect to the metadata concerned in the present invention, "1st Draft of Metadata Specification SP003v1.3" up to June 2002 has been published.

A configuration of the PDR will be briefly described with reference to FIG. 1. The PDR 100 receives video/audio signals and metadata via a variety of networks such as sky waves, satellite waves, internet networks and the like from a provider 200 for providing video/audio signals, collects viewing and listening patterns, and personal tastes of users, if necessary, and transmits them to the provider 200 for providing the video/audio signals. The PDR 100 comprises a high volume storage device for storing therein the received video/audio signals and metadata. The PDR 100 further comprises software for storage and reproduction of the video/audio signals, and an electronic program guide (EPG) application for retrieving and displaying metadata for the video/audio signals. The user ascertains the metadata for the video/audio data, i.e., titles of the programs, program reproduction times and the like, through a grid guide screen of the EPG application shown in FIG. 2, selects a desired program, and receives it via the network in real time or reproduces the video/audio data previously stored in the high volume storage device.

The metadata refer to data describing contents such as titles and synopses of programs, and are defined as "data about data." In the TVA metadata specifications of the TV-Anytime Forum, its structure is defined by use of XML schema language (see XML 1.0 of W3C), the standard by the W3C (a consortium for promoting standards for the XML), and the semantics and attributes of the respective metadata elements are also defined. The TVA metadata relevant to broadcasting contents are configured with an XML document having a root node, "TVAMain (300)" as shown in FIG. 3. The TVA metadata relevant to programs are configured with, for example, nodes such as ProgramInformation Table, GroupInformation Table, ProgramLocation Table, ServiceInformation Table and the like, under the node of "ProgramDescription."

In the TV-Anytime Forum, the TVA metadata are transmitted on a fragment basis as an independent unit in order to transmit a large volume of TVA metadata in a stream format. The concept of fragments will be briefly described with reference to FIG. 4. The fragments are obtained by dividing the TVA metadata configured with the XML documents shown in FIG. 3 into predetermined tree structures. For example, where the entire TVA metadata are divided into a tree structure (fragment TVAMain) including an upper node of "TVAMain" and predetermined child nodes under this upper node, a tree structure (fragment ProgramInformation) including an upper node of ProgramInformation Table and child nodes under this upper node, a tree structure (fragment BroadcastEvent) including an upper node of the BroadcastEvent Information and child nodes under this upper node, each of the divided tree structures becomes a fragment. The fragments can be transmitted independently of the other fragments, and the fragments can be accessed individually.

For individual access to the fragments, it is necessary to know a node referenced by a transmitted TVA metadata fragment, i.e., a node corresponding to the upper node of the TVA metadata fragment, in the entire metadata tree structure, and to describe relative paths in the TVA metadata fragments of keys contained in the transmitted TVA metadata fragment. To this end, XPath, which is a syntax for describing a path to one or more nodes in an XML document defined by W3C, is used. The term 'key' refers to a specific field of the metadata used for indexing, and also means child nodes of a node referenced by a fragment. Fields (for search conditions) input by the user, such as 'Service ID' and 'Published Time,' correspond to the keys.

In order to provide efficient search for and access to fragments, an index structure for the keys included in the metadata fragments is additionally required, and information on the index structure, i.e., index information, is also transmitted independently of the metadata fragments.

Under the environment provided by the TV-Anytime Forum, if a user desires to retrieve information on a program meeting a predetermined Published Time condition, the index information transmitted thereto independently of the fragments is utilized to identify the location (identifier) of a metadata fragment meeting a desired Published Time condition and an access to the relevant metadata fragment is then made based on the location (identifier), so as to extract metadata meeting the Published Time condition.

TV-Anytime Specification TV145, J. P. Evain, "1st Draft of Metadata Specification SP003v1.3", TV-Anytime Forum 17th meeting, Montreal, Canada, June 2002; hereinafter, referred to as "Key index art reference" proposes a key index data stream structure for a metadata fragment index.

The notion of a container defined by the TV-Anytime Forum will be described prior to describing the index structure.

The TV-Anytime Forum defines a container as a top-level storage to which all the data covering the aforementioned index information and the metadata fragments are transmitted, which is called a type of top-level transmission. Describing the container briefly, each container comprises a plurality of sections, each storing therein the index information or the metadata fragments. The container can be classified into an index container and a data container according to the information carried thereby: the index container carries index information sections such as a key index list (key_index_list) section, a key index (key_index) section, a sub key index (sub_key_index) section, a string repository (string_repository) section and a fragment data repository (fragment_data_repository) section, whereas a data container carries metadata fragment sections such as an elements table (elements_table) section, a string repository (string_repository) section and a fragment data repository (fragment_data_repository) section. The above classification is done based on the contents of the information included in the containers. Both the index container and the data container are identical in configuration.

Referring to the container defined by the TV-Anytime Forum as illustrated in FIG. 5, the container comprises a container identifier (container_id) data field (not shown) and a large number of sections. In each section, the contents stored in 'section_body' are identified according to an encoded value in 'section_id'. For example, a section 10 of which the encoded value in 'section_id' is '0X0004' is identified as a key index list (key_index_list) section, a section 20 of which the encoded value in 'section_id' is '0X0005' is identified as a key index (key_index) section, a section 30 of which the encoded value in 'section id' is '0X0006' is identified as a sub key index (sub_key_index) section, a section 40 of which the encoded value in 'section id' is '0X0001' is identified as an element table (element_table) section, and a section 50 of which the encoded value in 'section id' is '0X0003' is identified as a fragment data repository (fragment_data_repository) section.

The TVA metadata fragments are stored in the fragment data repository (fragment_data_repository) section 50 of the data container and then transmitted. The identifier information (handle_value) for the TVA metadata fragments in the data container is included in the element table section 40 of the data container.

In conclusion, the TVA metadata fragment is uniquely identified by the container identifier information (container_id) and the metadata fragment identifier information (handle_value) of the container that includes the TVA metadata fragment.

The key index art reference described above proposes the key index structure for indexing the TVA metadata fragments stored in the aforementioned data container, i.e., a structure composed of the key index list (key_index_list) section 10, the key index (key_index) section 20, and the sub key index (sub_key_index) section 30. Since the syntax of the structure is described in detail in the key index art reference described above, the detailed description thereof will be omitted. Hereinafter, the structure will be described with reference to FIG. 6 that illustrates the structure by segments of the index information.

The key index list (key_index_list) section 10 defined in the key index structure provides a list of all the keys transmitted. The list includes key information defining each key and identification information on the key index (key_index) section 20 to be described later. The key information comprises (1) location information of the metadata fragment relevant to the key, and (2) location information of the key within the metadata fragment. The location information of the metadata fragment is expressed in XPath (fragment_xpath_ptr) in the TVA. The location information of the key is expressed in XPath (key_xpath_ptr) for the relative path within the relevant fragment of the nodes used as the key in the TVA.

The XPath of the metadata fragment is a path to the root node of the TVA metadata XML document, i.e., an absolute path, and the XPath of the nodes used as the keys, i.e., the XPath of the keys, represents a relative path of the key for the relevant metadata fragment. The XPath for the metadata fragment and the XPath for the key are stored in a 'fragment_xpath_ptr' segment 11 and a 'key_xpath_ptr' segment 12, respectively.

Furthermore, the key index list (key_index_list) section 10 includes the identification information on the key index (key_index) section 20 of each key to be described later (i.e., the container identifier information (container_id) of the container storing therein the key index (key_index) section 20 and the key index identifier information). The container identifier information and the key index identifier information are stored in an 'index_container' segment of the key index list (key_index_list) section 10 and a 'key_index_identifier' segment, respectively, and then transmitted.

The key index (key_index) section 20 defined in the key index structure provides a list of information representing the ranges of values of the key included in the respective sub key index (sub key_index) section 30, i.e., the highest value of the key among the values of the key within the respective range (hereinafter referred to as a 'representative key value'), and identification information on the sub key index (sub_key_index) section 30 relevant to each representative key value (i.e., the container identifier information (container_id) of the container storing therein the sub key index (sub_key_index) section, and the sub key index identifier information).

Accordingly, the key index section (key_index) 20 includes a 'key_index_identifier' segment for storing therein the key index identifier information defined in the key index list (key_index_list) section 10, 'high_key_value' segments 13 for storing therein the representative key values of the respective ranges of values of the key included in the sub key index (sub_key_index) section 30, and 'sub_index_container' segments and 'sub_index_identifier' segments for the identification information on the sub key index (sub_key_index) section 30 (i.e., for the container identifier information (container_id) of the container in which the sub key index (sub_key_index) section 30 is stored, and the respective sub key index identifier information). The sub key index (sub_key_index) section 30 defined in the key index structure provides a list of the values of the key. The list further includes identification information on the metadata fragments corresponding to the values of the key (i.e., the container identifier information (container_id) of the containers storing the metadata fragments and the identifier information (handle_value) of the metadata fragments).

Accordingly, the sub key index (sub_key_index) section 30 includes a 'sub_index_identifier' segment for storing therein the sub key index identifier information defined in the key index (key_index) section 20, 'key_value' segments 14 for storing therein the respective ranges of values of the key, 'target_container' segments for storing therein the respective container identifier information (container_id) of the containers in which the metadata fragments are stored, and 'target_h- andle' segments for storing therein the respective fragment data identifier information (handle_value). The key index structure may be more easily understood by referring to FIG. 7 illustrating the index information.

FIG. 7 shows the key index list (key_index_list) section including keys relevant to the Service Id, the Published Time and the Published Duration. The upper node of the metadata fragment including the keys relevant to the Service Id, the Published Time and the Published Duration is 'BroadcastEvent' 310 as shown in FIG. 3, identified by a shaded block. Accordingly, the XPath '/TVAMain/ProgramDescription/ProgramLocationTable/BroadcastEvent' for the 'BroadcastEvent' fragment is stored in the 'fragment_xpath_ptr' segment 11a, and the XPaths to the keys of the Service Id, the Published Time and the Published Duration for the 'BroadcastEvent' fragment, i.e., '@ServiceId' (311a in FIG. 3), 'EventDescription/PublishedTime' (311b in FIG. 3) and 'EventDescription/PublishedDuration' (311c in FIG. 3) are stored in the 'key_xpath_ptr' segment 12a.

The index structure will be more comprehensible with reference to FIG. 7 which illustrates the index information.

FIG. 7 shows the key index list (key_index_list) section including keys for Service ID, Published Time and Published Duration, wherein a upper node of the metadata related to the Service ID, the Published Time and the Published Duration is 'BroadcastEvent' 310 indicated as a shaded portion in FIG. 3. Accordingly, the XPath for the 'BroadcastEvent' fragment, '/TVAMain/ProgramDescription/ProgramLocationTable/BroadcastEvent' is stored in the 'fragment_xpath_ptr' segment, and the respective XPaths for keys of Service ID, Published Time and Published Duration for the 'BroadcastEvent' fragment, '@ServiceID' (see 311a of FIG. 3), 'EventDescription/PublishedTime' (see 311b of FIG. 3), and 'EventDescription/PublishedDuration' (see 311c of FIG. 3) are stored in the 'key_xpath_ptr' segment.

Also, FIG. 7 shows the key index (key_index) section 20 and the sub key index (sub_key_index) section 30 for the Service ID (the XPath of the key: @ServiceID) of the key index list (key_index_list) section 10.

In such an index structure, when a search condition for searching the metadata is input, location information on a field of the input search condition in the metadata is determined and the determined location information is compared to the key information in the key index list so as to search the key having the determined location information within the key index list, overhead is caused since comparison of both Xpaths is necessary. The same problem occurs when the keys indicating relative paths from the fragments among the key information are compared in terms of location information. Particularly, this problem becomes more severe when fragments, which are more complex than the keys, are compared in terms of location information. Since the XPath of the fragment representing location information among key information describes a path to a relevant node from the root node on the XML document, transmission costs are inefficient and interpretation costs of the XPath in the terminal are high. For example, the XPath of the broadcast event fragment indicating location information of a program among the TV-Anytime fragments can be expressed as /TVAMain/ProgramDescription/ProgramLocationTable/BroadcastEvent'.

Meanwhile, in order to represent one node on the XML document, the XPath can be expressed in an alternative manner. In the case of a broadcast event, in addition to the aforementioned normal representation, the XPath can be expressed alternatively, such as '/TVAMain//BroadcastEvent' or '//BroadcastEvent,' and so on. Herein, '//' means a child node in the structure of an XML document. Therefore, an operation to inspect whether fragments are the same by use of the XPath is not a simple one that merely matches simple strings with each other. In particular, overhead is caused in analysis/comparison of the relevant path, if the XPath path is expressed in an abbreviated format.

SUMMARY OF THE INVENTION

Accordingly, an aspect of the present invention is to provide an index structure of metadata including information of a key encoded so as to allow information on contents to be searched more quickly.

Another aspect of the present invention is to provide a method of providing an index of the metadata capable of searching the information on contents in a fast manner, a method of searching the metadata using the metadata index, and a searching apparatus using the same. Additional aspects and/or advantages of the present invention will be set forth in part in the description which follows and, in part, will be obvious from the description, or may be learned by practice of the invention.

To achieve the above and/or other aspects of the resent invention, there is provided an index structure for metadata divided into fragments, comprising a list of keys corresponding to fields of the metadata, and location information for defining a key, wherein at least a part of the location information is expressed as a predetermined code.

The index structure may further comprise values of the key and identification information of the metadata corresponding to the values of the key. The index structure may further comprise a sub-section including ranges of values of the key and identification information on ones of the fragments of the metadata corresponding to the values of the key, and a section including representative key values representing the respective ranges of values of the key.

The list may include identification information on the section, and the section may further include identification information on the sub-section. Each of the representative key values may be a value among the corresponding range of values of the key.

Another part of the location information may be expressed as another predetermined code or XPath.

The location information may comprise location information of a fragment including the key, and location information of the key within the fragment.

One of the location information of the fragment and the location information of the key may be expressed as the predetermined code.

The other one of the location information of the fragment and the location information of the key may be expressed as another predetermined code or XPath.

The predetermined code may be assigned in advance to the location information frequently referred. The predetermined code may comprise XPath as additional information where the respective fragment/key corresponds to a user defined type.

To achieve the above and/or other aspects of the present invention, there is provided another index structure for metadata divided into fragments, comprising a key index list section comprising a list of keys corresponding to fields of the metadata, and location information for defining the keys, wherein at least a part of the location information is expressed as a predetermined code, a key index section, and a sub-key index section, wherein for a key of the key index list, the sub-key index section comprises ranges of values of the key and identification information on ones of the fragments of the metadata corresponding to the values of the key, and the key index section comprises representative key values representing the respective ranges of values of the key.

The representative key value may comprise at least one of a maximum value, a minimum value or an intermediate value among the values within the respective range.

The metadata may have a structure of metadata as defined in TVA Forum. The index structure may further comprise a corresponding key index section and a corresponding sub-key index section for another key of the key index list.

The location information may comprise location information of a fragment including the keys, and location information of the keys within the fragment. The key index list section may further comprise identification information on the key index section, and the key index section may further comprise identification information on the sub-key index section.

To achieve the above and/or other aspects of the present invention there is provided still another index structure for metadata divided into fragments, comprising a list of keys corresponding to fields of the metadata, and location information for defining the keys, wherein at least a part of the location information is expressed as a predetermined code, and values of the keys and identification information on the metadata corresponding to the values of the keys.

The identification information may comprise identification information on the fragments of the metadata corresponding to the values of the keys.

To achieve the above and/or other aspects of the present invention there is provided a method of providing an index structure for metadata divided into fragments, the method comprising providing a list of keys corresponding to fields of the metadata, and location information for defining a key, wherein at least part of the location information is expressed as a predetermined code.

The method may further comprise providing values of the key and identification information on the metadata corresponding to the values of the key.

The method may further comprise providing a sub-section including ranges of values of the key and identification information on ones of the fragments of the metadata corresponding to the values of the key, and providing a section including representative key values representing the respective ranges of values of the key.

The location information may comprise location information of a fragment including the key, and location information of the key within the fragment.

The providing of the list may comprise providing the list having one of the location information of the fragment and location information of the key encoded as the predetermined code.

The predetermined code may comprise XPath as additional information where the respective fragment/key corresponds to a user defined type.

To achieve the above and/or other aspects of the present invention there is provided another method of providing an index structure for metadata divided into fragments, the method comprising providing a key index list section comprising a list of keys corresponding to fields of the metadata, and location information defining the keys, wherein at least part of the location information is expressed as a predetermined code, providing a key index section, and providing a sub-key index section, wherein for a key of the key index list, the sub-key index section comprises ranges of values of the key and identification information on ones of the fragments of the metadata corresponding to the values of the key, and the key index section comprises representative key values representing the respective ranges of values of the key.

To achieve the above and/or other aspects of the present invention there is provided still another method of providing an index structure for metadata divided into fragments, the method comprising providing a list of keys corresponding to fields of the metadata, and location information for defining the keys, wherein at least part of the location information is expressed as a predetermined code, and providing values of the keys and identification information on the metadata corresponding to the values of the keys.

The identification information may comprise identification information on the fragments of the metadata corresponding to the values of the keys.

To achieve the above and/or other aspects of the present invention, there is provided a method of searching for metadata divided into fragments, using an index having a list of keys corresponding to fields of the metadata, and location information for defining the keys, the method comprising searching from the index of the metadata, a key corresponding to a search condition of a field of the metadata, wherein at least a part of the location information defining the key is expressed as a predetermined code value, and extracting a fragment of the metadata using the searched key.

The searching of the key may comprise determining location information corresponding to the field of the search condition with respect to the metadata, and searching for the key corresponding to the location information with respect to the field of the search condition.

The extracting of the fragment comprise searching for a value of the key meeting the search condition among values of the key from the index, and extracting identification information on the fragment of the metadata corresponding to the value of the key.

In response to a plurality of values of the key meeting the search condition, the extracting of the fragment may comprise extracting ones of the fragments of the metadata corresponding to the values of the key meeting the search condition.

The searching of the value may comprise searching a representative key value meeting the search condition, among representative key values of the index corresponding to ranges of values of the key, and searching for the value among a range of values corresponding to the representative key value.

The index may comprise a key index list section comprising the list, a sub-key index section comprising ranges of values of the key and identification information on ones of the fragments of the metadata corresponding to the values of the key, and a key index section comprising representative key values representing the respective ranges of values of the key.

The location information may comprise location information of a fragment of the metadata including the key, and location information of the key within the fragment.

To achieve the above and/or other aspects of the present invention, there is provided another method of searching for metadata divided into fragments, the method comprising accessing a list comprising a plurality of combinations of location information on a fragment and location information defining at least one key within the fragment, wherein one of the location information on the fragment and the location information defining the at least one key is expressed as a predetermined code, and searching from the list, a combination corresponding to an input search condition of at least one key of the metadata.

The other location information may be expressed as another predetermined code or XPath.

The method may further comprise extracting one or more fragments of the metadata corresponding to identification information on the metadata identified by the selected combination.

To achieve the above and/or other aspects of the present invention, there is provided an apparatus for searching for metadata divided into fragments, using an index having a list of keys corresponding to fields of the metadata, and location information defining the keys, comprising an input unit receiving a search condition having a field of the metadata as a search parameter, and a control unit searching from the index of the metadata, a key corresponding to the search condition, wherein at least a part of the location information defining the key is expressed as a predetermined code value, and extracting a fragment of the metadata using the searched key.

The predetermined code value may comprise XPath as additional information where the respective fragment/key corresponds to a user defined type.

The location information may comprise location information of a fragment of the metadata including the key, and location information of the key within the fragment.

The control unit may search a value of the key meeting the search condition among values of the key from the index, and extract identification information on the fragment of the metadata corresponding to the value of key.

The apparatus may further comprise a receiving unit receiving the metadata, a storage unit storing therein the received metadata, and an output unit outputting the search result by the control unit. In response to a plurality of values of the key meeting the search condition, the control unit may extract ones of the fragments of the metadata corresponding to the values of the key meeting the search condition.

The control unit may search for a representative key value meeting the search condition, among representative key values of the index corresponding to ranges of values of the key, and search for the value among a range of values corresponding to the representative key value. The metadata may have a structure of metadata as defined by the TV-Anytime Forum.

To achieve the above and/or other aspects of the present invention, there is provided another apparatus for searching for metadata divided into fragments, comprising an input unit receiving a search condition of at least one key of the metadata, and a control unit selecting from a list comprising a plurality of combinations of location information on a fragment and location information defining at least one key within the fragment, a combination corresponding to the search condition, wherein one of the location information on the fragment and the location information defining the at least one key is expressed as a predetermined code.

The other location information may be expressed as another predetermined code or XPath. The control unit may extract one or more fragments of the metadata corresponding to identification information on the metadata identified by the selected combination.

To achieve the above and/or other aspects of the present invention, there is provided a computer readable medium containing a data structure for storing an index for metadata divided into fragments, the index provided to search the metadata, the data structure comprising a list of keys corresponding to fields of the metadata, and location information for defining a key, wherein at least a part of the location information is expressed as a predetermined code.

To achieve the above and/or other aspects of the present invention, there is provided another computer readable medium containing a data structure for storing an index for metadata divided into fragments, the index provided to search the metadata, the data structure comprising a key index list section comprising a list of keys corresponding to fields of the metadata, and location information for defining the keys, wherein at least a part of the location information is expressed as a predetermined code, a key index section, and a sub-key index section, wherein for a key of the key index list, the sub-key index section comprises ranges of values of the key and identification information on ones of the fragments of the metadata corresponding to the values of the key, and the key index section comprises representative key values representing the respective ranges of values of the key.

To achieve the above and/or other aspects of the present invention, there is provided still another computer readable medium containing a data structure for storing an index for metadata divided into fragments, the index provided to search the metadata, the data structure comprising a list of keys corresponding to fields of the metadata, and location information for defining the keys, wherein at least a part of the location information is expressed as a predetermined code, and values of the keys and identification information on the metadata corresponding to the values of the keys.

To achieve the above and/or other aspects of the present invention, there is provided for each of the methods described above, a computer-readable medium comprising computer-executable instructions for performing the operation(s) recited in the method.

BRIEF DESCRIPTION OF THE DRAWINGS

The above and other aspects and features of the present invention will become apparent from the following description of exemplary embodiments given in conjunction with the accompanying drawings, in which.

DESCRIPTION OF THE EXEMPLARY EMBODIMENTS

Hereinafter, an index structure of metadata provided for searching for information on contents, and a method for providing indices of the metadata, and a method and an apparatus for searching for the metadata using the index structure of the metadata will be described in detail with reference to the accompanying drawings.

The embodiments will be described on the basis of TVA metadata in this specification for the sake of description; however, this will not be interpreted or comprehended in limiting the coverage of protection of the present invention.

Figure 8:
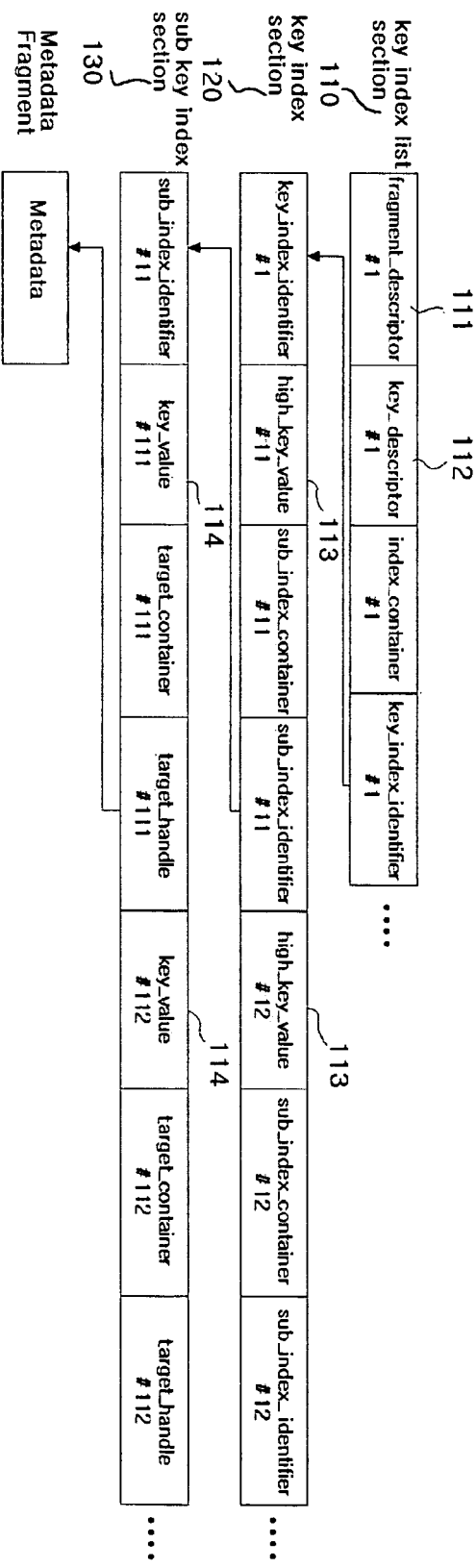
FIG. 8 is a block diagram illustrating an index structure of metadata according to an embodiment of the present invention.

FIG. 8 shows an index structure of metadata for searching the metadata according to an embodiment of the present invention, wherein the index structure includes information for defining a key so as to index TVA metadata fragments stored in the data container as described above. Hereinafter, a key index list (key_index_list) section 110, a key index (key_index) section 120 and a sub key index (sub_key_index) section 130 will be described, and the index structure including encoded key information defined by the syntax will be then described.

The syntax defining the index structure of the metadata according to one embodiment of the present invention, in particular, including the encoded key information, is different in concept from the syntax defined in a conventional key index art reference in that it comprises structures newly introduced for an encoding concept of the key information, such as fragment_descriptor( ) and key_descriptor( ), and reorganizes structures of the key index list (key_index_list) section 110, the key index (key_index) section 120 and the sub key index (sub_key_index) section 130.

The key index list (key_index_list) section 110 comprises key information defining respective keys and identification information on the key index (key_index) section 120 to be described later.

The key information serves to define the keys, i.e., location information in the metadata, which predetermined fields of the metadata constituting the keys have. The key information comprises location information of a metadata fragment to which the fields constituting the keys belong within the metadata (hereinafter referred to as "location information of a fragment," which is expressed as XPath of the fragment in TVA (fragment_xpath_ptr)), and location information of fields constituting the keys that are within the respective metadata fragment (hereinafter referred to as, for example, "location information of a key," that is, an XPath for a relative path of the node within the relevant fragment, which is expressed as XPath of the key in TVA (i.e., key_xpath_ptr).

1. Key Index List (key_index_list) Section

The key index list (key_index_list) section provides a list of all the transmitted keys.

In an embodiment of the present invention, a 'fragment_xpath_ptr' indicating location information of the fragment within the conventional key index list (key_index_list) section (expressed as XPath of the fragment in the TVA) is replaced with a fragment_descriptor( ).

TABLE 1

| Syntax | No. of Bits (changeable) |
|---|---|
| key_index_list( ) { | |
| for (j=0; j<key_index_count; j++) { | |
| fragment_descriptor( ) | 16 |
| key_descriptor( ) | 16 |
| index_container | 16 |

TABLE 1-continued

| Syntax | No. of Bits (changeable) |
|---|---|
| key_index_identifier | 8 |
| } | |
| } | | key_index_count: specifies the number of all the transmitted keys, i.e., the number of indices for the entire XML document.
fragment_descriptor( ): corresponds to XPath location of a target fragment(s) to be indexed. According to an embodiment of the present invention, the location information of the fragment is expressed as a predetermined code, as shown in Table 3 below for the standard fragment type. The type of the fragment is not limited to the standard fragment type of Table 3, and the fragment can be shaped as random as possible as far as its shape can indicate XPath of the fragment to define the keys.
key_descriptor( ): corresponds to XPaths of the keys within the XPath location of the target fragment to be indexed. Where the location information of the key is expressed as a predetermined code, similarly to the fragment type described above, the standard key type can be described. As described above with reference to the fragment_descriptor( ), the type of key is not limited to the standard key type.
index_container: identifies the container in which a specified key index (key_index) section exists.
key_index_identifier: identifies the key index (key_index) section within the container specified by the index_container. The key index (key_index) section can be identified in a unique manner in combination of the index_container and the key_index_identifier.

2. Fragment Descriptor (fragment_descriptor)

The 'fragment_descriptor( )' provides a structure of encoding specific bits (which may be encoded to arbitrary bits such as 8 bits, 16 bits and so on) relative to the standard fragment type frequently used, and at the same time, a structure capable of describing XPath as additional information relative to the metadata fragment type defined by the user. That is, where the fragment_descriptor is '0xFF', it indicates a user-defined fragment, and thus, XPath for the relevant user-defined fragment is immediately described.

TABLE 2

| Syntax | (No. of Bits changeable) |
|---|---|
| fragment_descriptor( ) { | |
| fragment_type | 8 |
| if (fragment_type == 0xFF) { | |
| fragment_xpath_ptr | 16 |
| } | |
| } | | fragment_type: represents the type of fragments to be indexed. Encoded values are assigned to the standard fragment types frequently used. If the fragment_type has an encoded value of 0xFF, the fragment_xpath_ptr is added as additional information.

Table 3 illustrates encoded values for location information of the frequently used fragment types when a search is conducted in the TV-Anytime. However, the standard fragment types and the encoded values in this embodiment are not limited to those illustrated in Table 3 but can be extended in accordance with applications.

TABLE 3

| Value | Description |
|---|---|
| 0x00 | Not Designated |
| 0x01 | ProgramInformation fragment |
| 0x02 | GroupInformation fragment |
| 0x03 | CreditsInformation fragment |
| 0x04 | ProgramReview fragment |
| 0x05 | SegmentInformation fragment |
| 0x06 | ServiceInformation fragment |
| 0x07 | BroadcastEvent fragment |
| 0xFF | User deisgnated fragment |
| 0x08-0x0E | Reserved |
| 0x10-0xFF | |

3. Key Descriptor (key_descriptor)

The 'key_descriptor( )' provides a structure of encoding location information of the keys having a high frequency of use to specific bits when a search is made, and at the same time, a structure of describing the key type defined by the user in XPath. For example, if the key_descriptor is '0xFF', it indicates a user-defined key. Thus, the XPath is described as additional information for the user-defined key.

TABLE 4

| Syntax | No. of Bits (changeable) |
|---|---|
| key_descriptor( ) { | |
|     key_type | 8 |
|         if (key_type == 0xFF) { | |
|             key_xpath_ptr | 16 |
|         } | |
| } | | key_type: represents the type of keys to be indexed. Encoded values are assigned to location information of the standard key types frequently used when a search is conducted. If the key_type has an encoded value of '0xFF', the key_xpath_ptr is added as additional information.
key_xpath_ptr: refers to the relative path involved in the fragment XPath of the node used as the key.

While the encoded values for the standard keys have not been specified, it will be understood that the encoded values for the standard key types may have a structure similar to encoding of the fragment types of Table 3.

Since the definitions of the key index (key_index) section and the sub key index (sub_key_index) section are the same as those defined in the key index art reference, the detailed description thereof will be omitted.

4. Key Index (key_index) Section

TABLE 5

| Syntax | No. of Bits (changeable) |
|---|---|
| key_index( ) { | |
|     key_index_identifier | 8 |
|     for (j=0; j<sub_index_count; j++) { | |
|         high_key_value | 16 |
|         sub_index_container | 16 |
|         sub_index_identifier | 8 |
|     } | |
| } | |

5. Sub Key Index (sub_key_index) Section

TABLE 6

| Syntax | No. of Bits (changeable) |
|---|---|
| sub_key_index( ) { | |
|     sub_index_identifier | 8 |
|     for (j=0; j<reference_count; j++) { | |
|         key_value | 16 |
|         target_container | 16 |
|         target_handle | 16 |
|     } | |
| } | |

Hereinafter, the metadata structure defined by the syntax described above will be discussed with reference to FIG. 8, in which the metadata is expressed as segments of the index information.

The key index list (key_index_list) section 110 defined in the index structure provides a list of all the transmitted keys. The list includes key information defining each key (i.e., location information of the fragment (fragment_descriptor) and/or location information of the keys (key_descriptor); the location information of the fragment or the location information of the key may be selectively encoded, or they may be encoded simultaneously depending on embodiments of the present invention) and identification information on the key index (key_index) section 120 to be described later. The XPath of the metadata fragment is a path for the root node of the TVA metadata XML document, i.e., an absolute path, in the same manner as in the conventional index structure, and the XPath of the node used as the key, i.e., the XPath of the key, represents a relative path of the key for the metadata fragment. The XPath of the metadata fragment and the XPath of the key in combination represents location information of the key for the entire XML document.

In the present embodiment, the encoded value corresponding to the XPath for the metadata fragment (that is, location information of the fragment group) and the encoded value corresponding to the XPath of the key (that is, location information of the key) are respectively stored in the 'fragment_descriptor' segment 111 and the 'key_descriptor' segment 112.

As describe above, where location information of the fragment among the key information is of the standard fragment type which is frequently used, there is provided an encoded value (fragment_descriptor) expressing the XPath for the metadata fragment (fragment_xpath_ptr) with a predetermined code. As the standard fragment types frequently used, there are for example, program information (ProgramInformation), program group information (GroupInformation), credit information (CreditInformation), program review (ProgramReview), segment information (SegmentInformation), broadcast event (BroadcastEvent), service information (ServiceInformation) and the like. If the XPath of the metadata fragment for these fragment types can be simply expressed as an encoded value, the overhead in the search for the metadata can be reduced.

Therefore, in the index structure according to the present embodiment, the XPath of the standard metadata fragment is encoded to a predetermined encoded value and then stored. Furthermore, all of the encoded values are not assigned to the fragments and some of the encoded values (e.g., '0xFF') are assigned to the metadata fragments as defined by the user, to thereby allow the user to additionally define location information on the metadata fragment by means of the XPath. In this regard, an additional area ('fragment_xpath_ptr'), for example, by which the XPath for the metadata fragment can be designated is provided.

In the embodiment in which fragments are encoded in accordance with Table 3, the location information on the metadata fragment among the key information has such encoded values as '0x01', '0x02' and '0x03.' The location information on the metadata fragment encoded to '0x01' indicates the XPath of the 'program information (ProgramInformation) fragment.' Further, where the location information on the metadata fragment is '0xFF,' it means the metadata fragment defined by the user, and thus, an additional area for enabling the XPath of the metadata fragment to be designated is provided.

Although the above embodiment has been described with respect only to the metadata fragment, the same may be applied with respect to the key(s) for the metadata fragment. That is, encoded values may be designated and used for the frequently used keys instead of the conventional XPath for the keys. In addition, if the encoded value comprises a predetermined value, the user may additionally designate the XPath for the key. The encoding of the XPath of the aforementioned metadata fragment and the encoding of the XPath of the key can be used simultaneously or independently.

Furthermore, the key index list (key_index_list) section 110 comprises the identification information on the key index (key_index) section 120 of each key to be described later (i.e., the container identifier information (container_id) of the container storing therein the key index (key_index) section 120, and the key index identifier information). The container identifier information and the key index identifier information are respectively stored in an 'index_container' segment and a 'key_index_identifier' segment in the key index list (key_index_list) section 110.

Since the key index (key_index) section 120 and the sub key index (sub_key_index) section 130 are the same as described in the key index art reference, the description thereof will be omitted.

The index structure including the encoded key information will be described in detail with reference to FIG. 9, which illustrates the index information according to an embodiment if the present invention.

Figure 7:
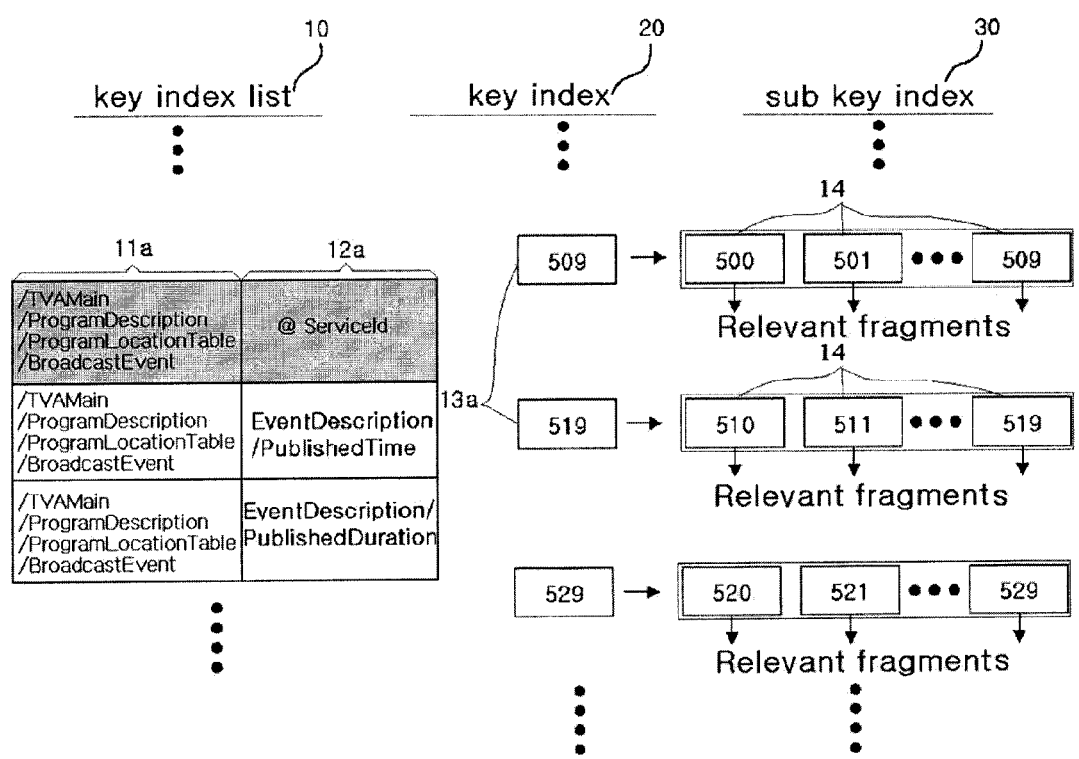
FIG. 7 is a block diagram illustrating an index structure of metadata and a searching process using the conventional key scheme.
Figure 9:
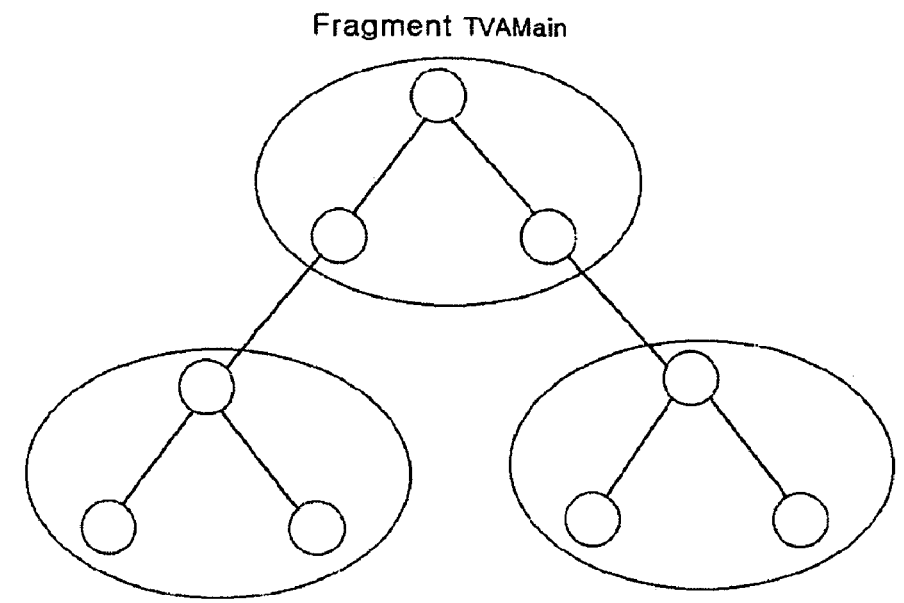
FIG. 9 is a schematic diagram illustrating an index structure of metadata and a searching process according to an embodiment of the present invention.
Figure 9:
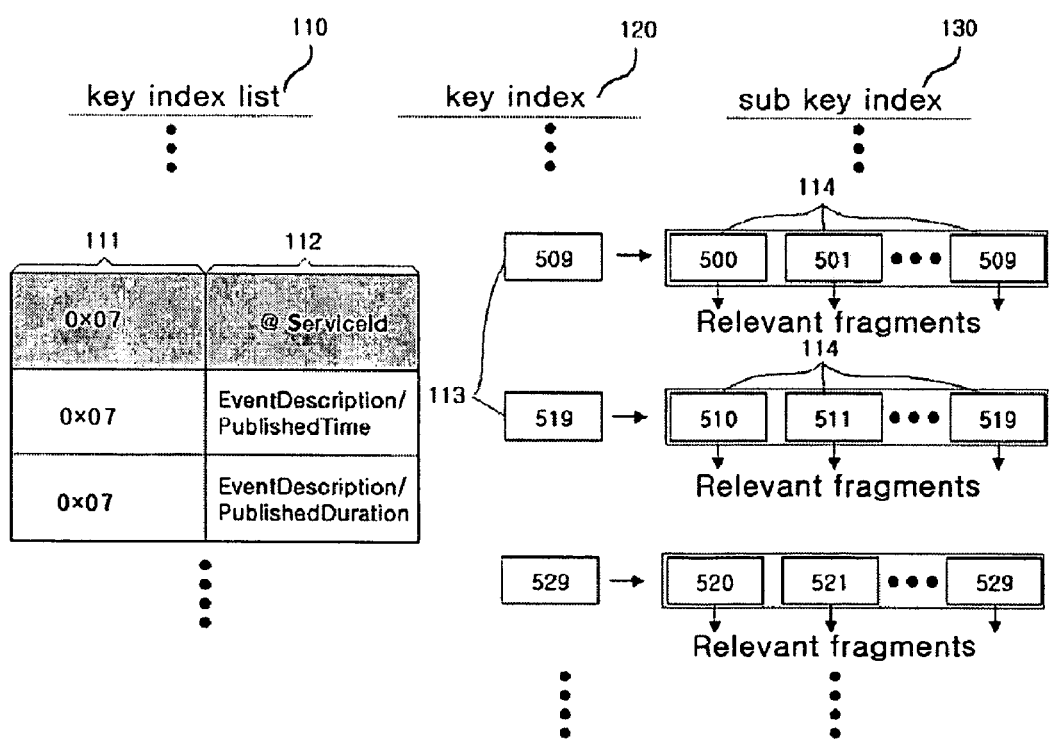

FIG. 9 shows the key index list section 110 in which the XPath of 'BroadcastEvent' fragment for the Service Id is encoded to '0x07.' Herein, the key index (key_index) section 120 and the sub key index (key_index) section 130 are the same as described with reference to FIG. 7.

The index structure described above is very effective when the keys related to the frequently used fragments types, e.g., ProgramInformation, GroupInformation, and BroadcastEvent and so on are used, thereby reducing the entire overhead in the apparatus for searching metadata.

Figure 10:
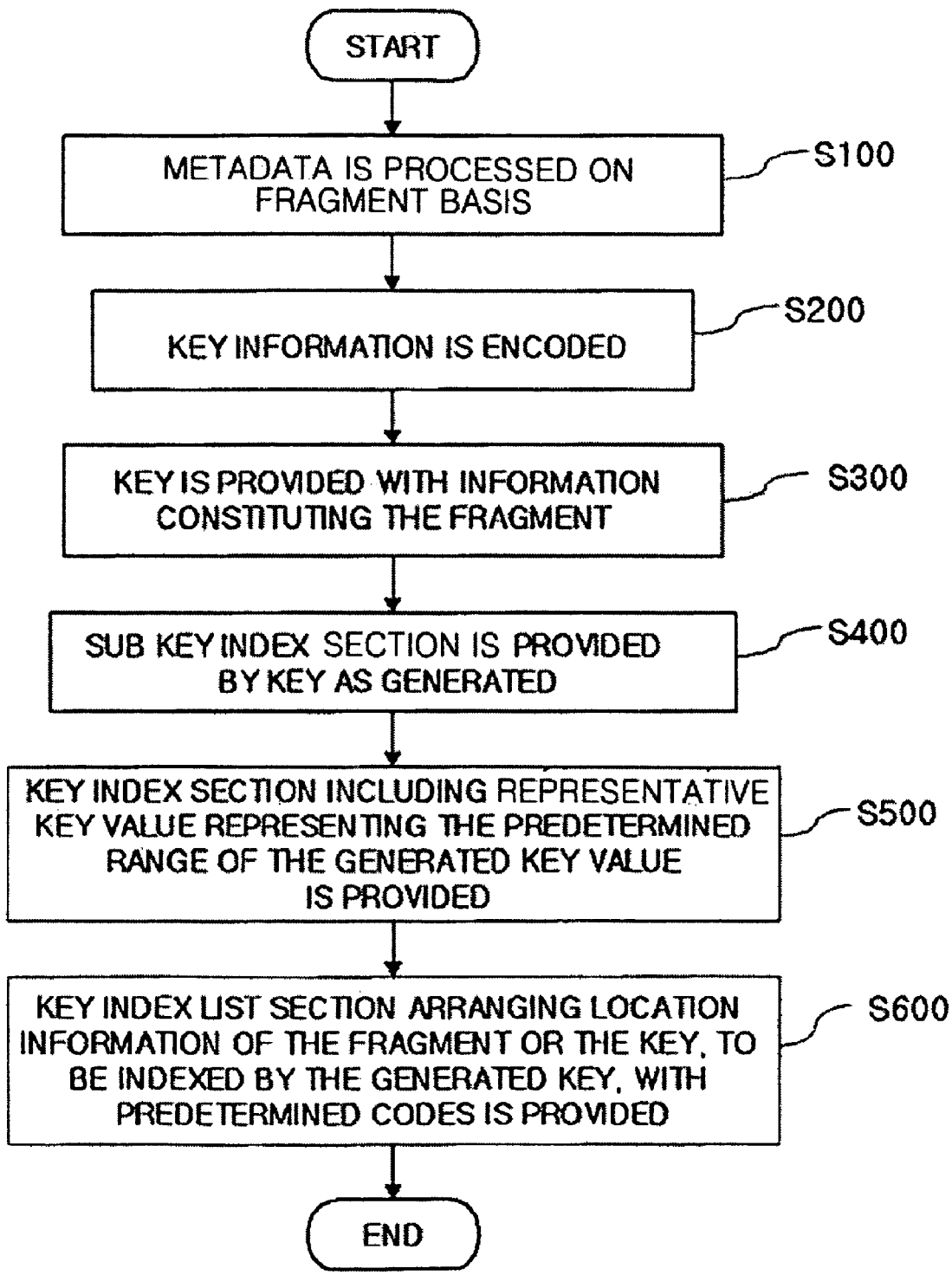
FIG. 10 is diagram illustrating a method of providing indices of metadata according to an embodiment of the present invention.

FIG. 10 illustrates a method of providing an index of metadata having a structure according to one embodiment of the present invention as described above.

Indices of the metadata according to one embodiment of the present invention can be generated by the provider 200 providing, for example, audio/visual signals.

Information on contents, that is, metadata, is first processed on a fragment basis as described above (S100). At least a portion (location information of the fragment or location information of the key) of information on the fields that will be included in the metadata index, that is, information on the key (for example, location information of the fragment and location information of the key) is encoded (S200). In other words, where location information of the metadata fragment to which fields constituting keys belong or location information of the key is of the standard fragment type or the standard key type, both of which can be encoded, the location information of the metadata fragment or the location information of the key, i.e., the XPath of the metadata fragment or the XPath of the key is encoded to the predetermined code value (for example, the 'broadcast event (BroadcastEvent) fragment is encoded to '0X07' in FIG. 9). Where the location information of the metadata fragment or the location information of the key is not identified by the encoded value, the key information expressed with XPath may be utilized as in the conventional art.

A key is provided by use of information constituting the fragment, for example, information on a 'Service ID' (S300). Then, a sub key index (sub_key_index) section 130 is provided for the key as provided above (S400). The sub key index (sub_key_index) section 130 includes segments 114 having therein ranges of values of the key, and metadata fragment identification information corresponding to the values of the key (that is, the container identifier information (container_id) and fragment data identifier information (handle_value) respectively stored in the 'target_container' segment and the 'target_container' segment of FIG. 8).

A key index (key_index) section 120 having representative key values representing the respective ranges of values of the key is provided (S500). For example, a representative key value (e.g., 509) indicating a predetermined range (e.g., 500~509) of the Service Id is included. The key index (key_index) section 120 includes therein identification information for the sub key index (sub_key_index) section 130, wherein the identification information comprises the container identifier information (container_id) of the container in which the sub key index (sub_key_index) section 130 is stored and the sub key index identifier information as shown in FIG. 8.

A key index list (key_index_list) section 110 arranging key information as provided above, that is, location information of the fragment and location information of the key, based on the key, is provided (S600). At this time, if the encoded location information of the fragment or the encoded location information of the key in the step of S200 exists, the location information above is expressed as an encoded code when the key index list (key_index-list) section 110 is provided. In other words, for example, the 'broadcast event (BroadcastEvent)' fragment in FIG. 9 is expressed as '0X07.' Where the location information of the fragment or the location information of the key can not be distinguished by an encoded value, the key information expressed in XPath as in the conventional art may be utilized.

The key index list (key_index_list) section 110 further comprises identification information on the key index (key_index) section 120, in addition to the key information.

The steps described above may proceed in reverse order in other embodiments of the present invention, and the step S500 of providing the key index (key_index) section 120 including therein the representative key values may be omitted depending on the embodiment(s).

Figure 11:
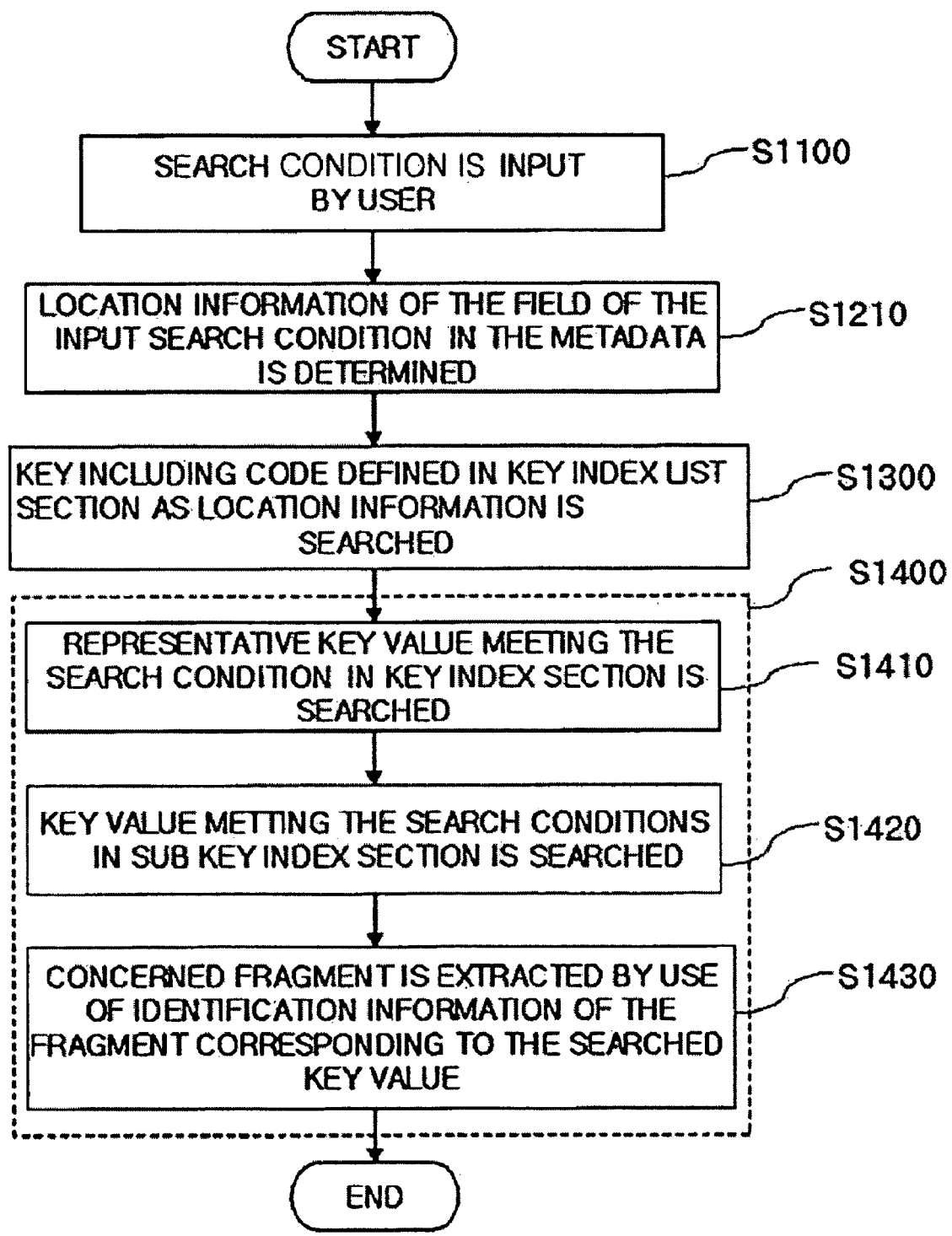
FIG. 11 is a diagram illustrating a method of searching for the metadata according to an embodiment of the present invention.

Hereinbelow, a method of searching for metadata meeting a search condition by use of the metadata index having a structure according to one embodiment of the present invention described above, will be described with reference to FIG. 11.

A search condition is input by, for example, a user (S1100), and location information of metadata relative to a field of the input search condition is determined (S1210). A key corresponding to the location information of the field is searched in the key index list (key_index_list) section 110 (S1300), wherein at least a part of location information, e.g., location information of a fragment including the key or location information of the key within the fragment, is defined with a predetermined code, and the concerned metadata is extracted by use of the searched key (S1400).

Figure 1:
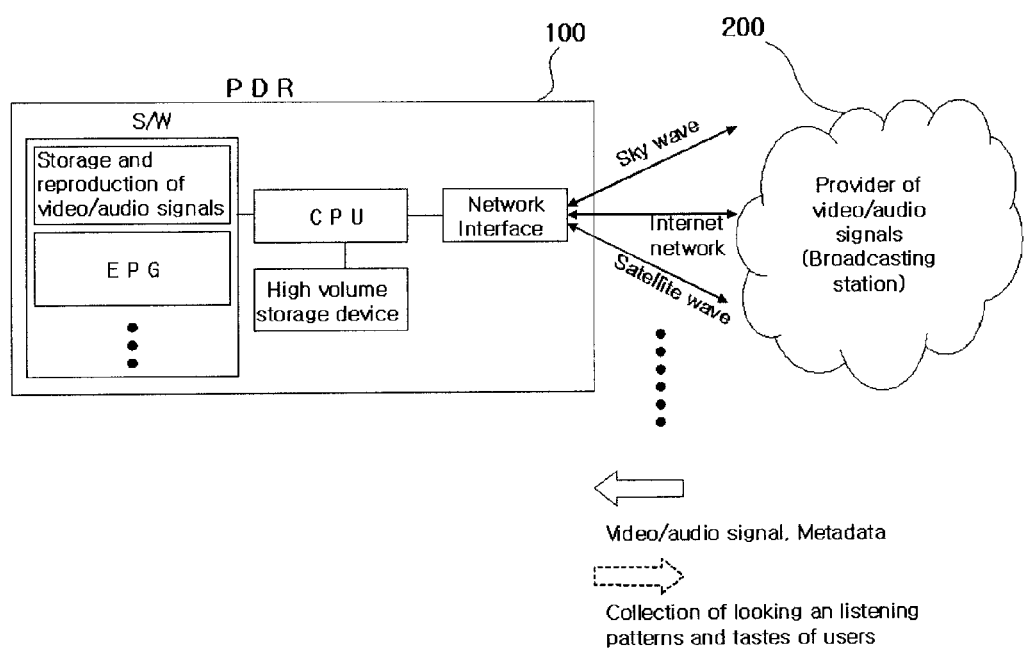
FIG. 1 is a schematic diagram illustrating a concept of a general PDR.
Figure 2:
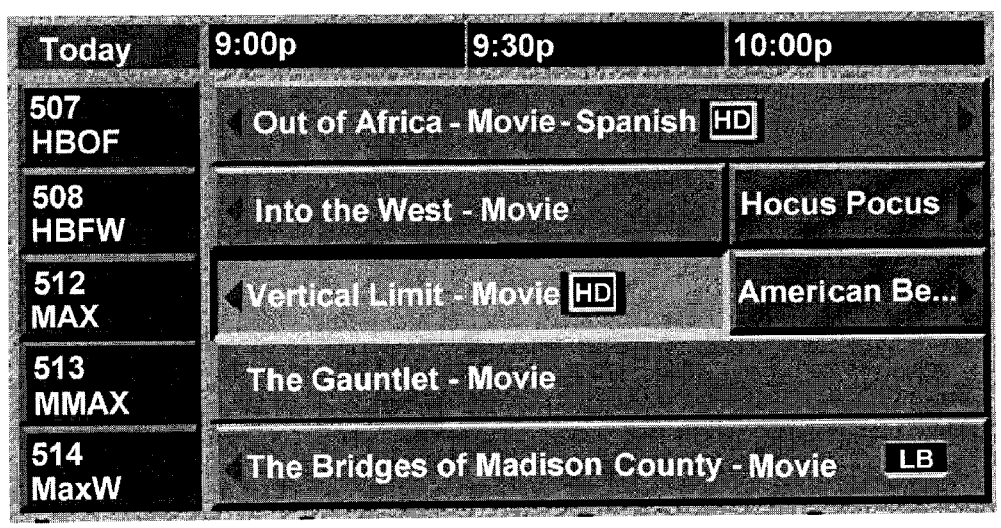
FIG. 2 shows a grid guide screen in a general EPG application.
Figure 3:
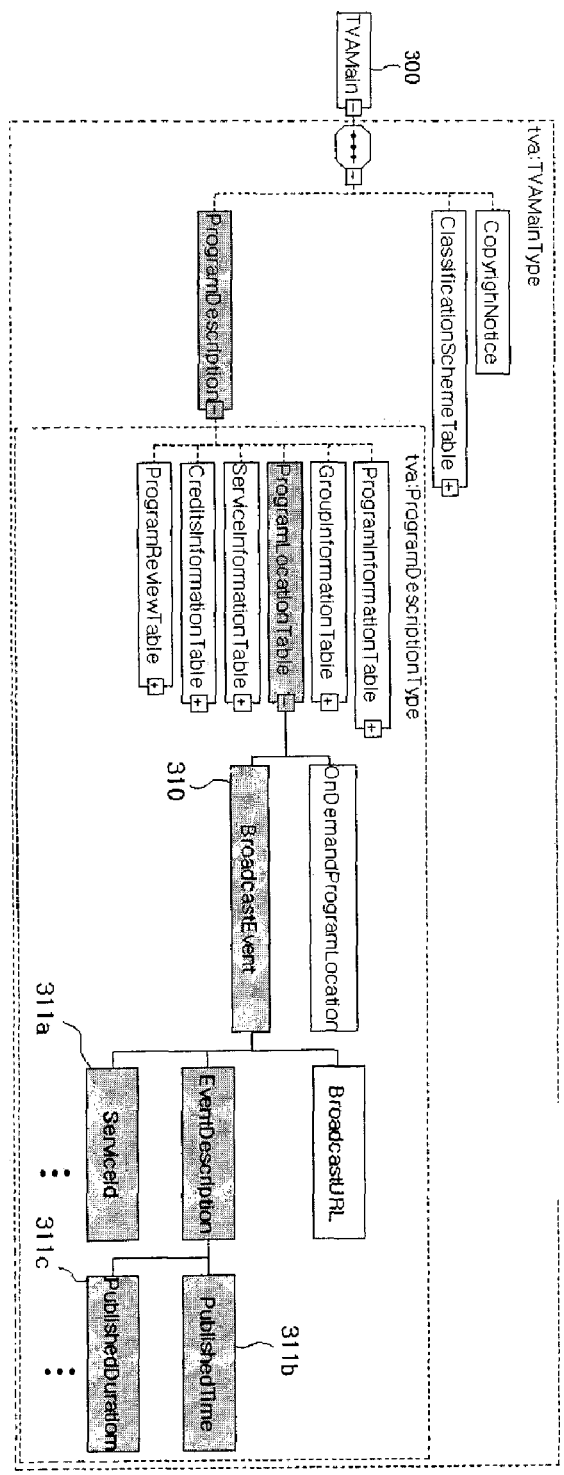
FIG. 3 is a block diagram illustrating a structure of general metadata defined by the TV-Anytime Forum.
Figure 4:
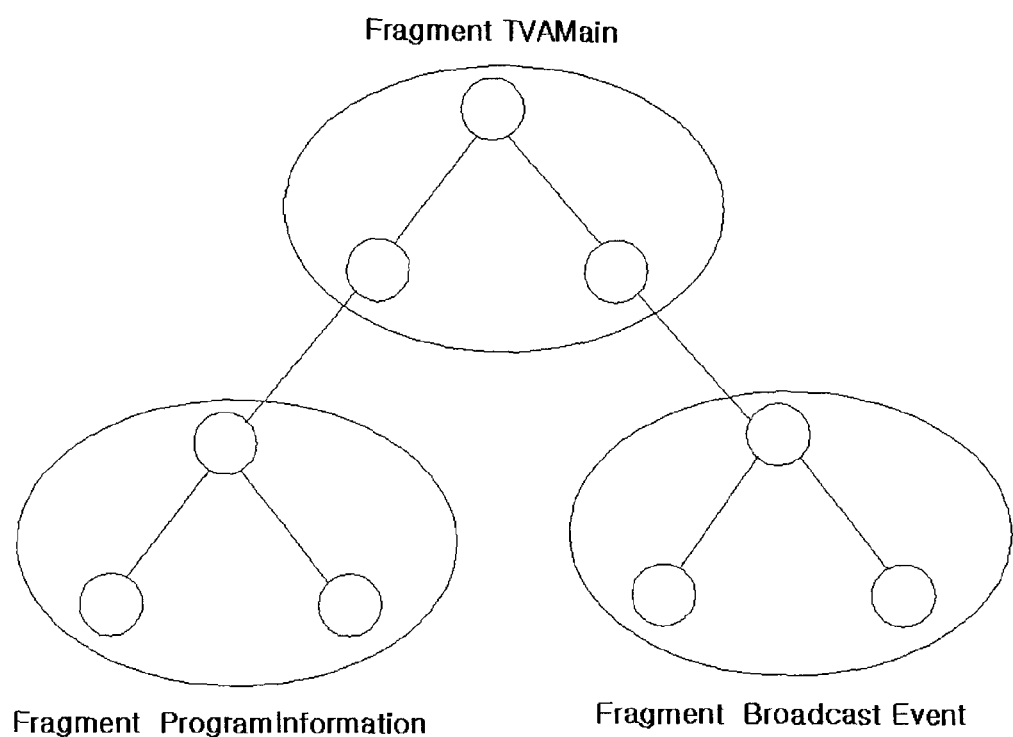
FIG. 4 is a schematic diagram illustrating a concept of a general fragment defined by the TV-Anytime Forum.
Figure 5:
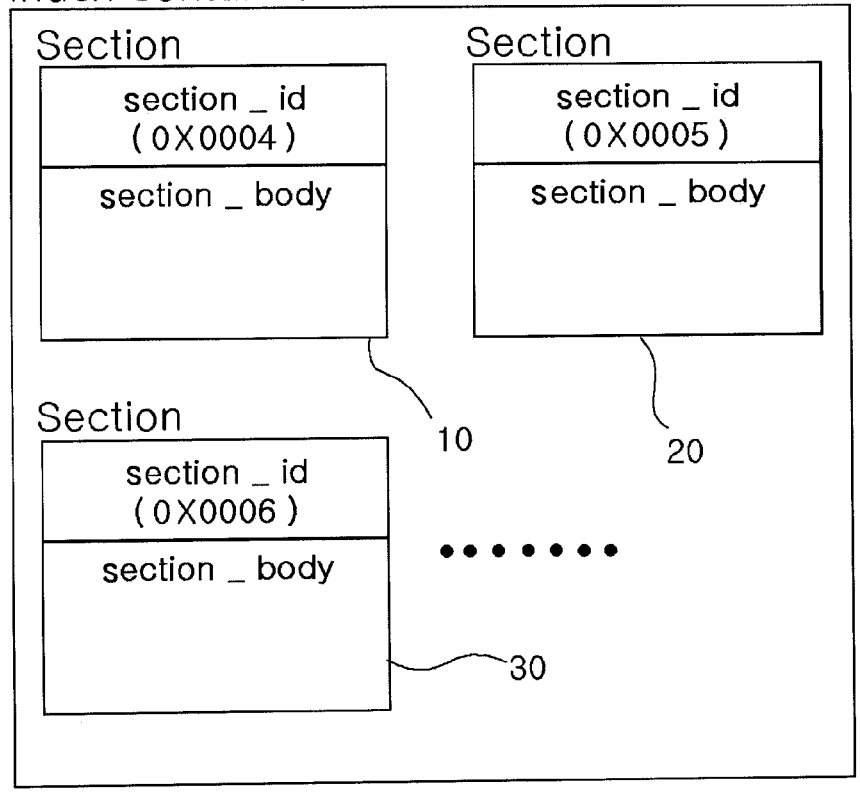
FIG. 5 is a schematic diagram illustrating a concept of a general container defined by the TV-Anytime Forum.
Figure 5:
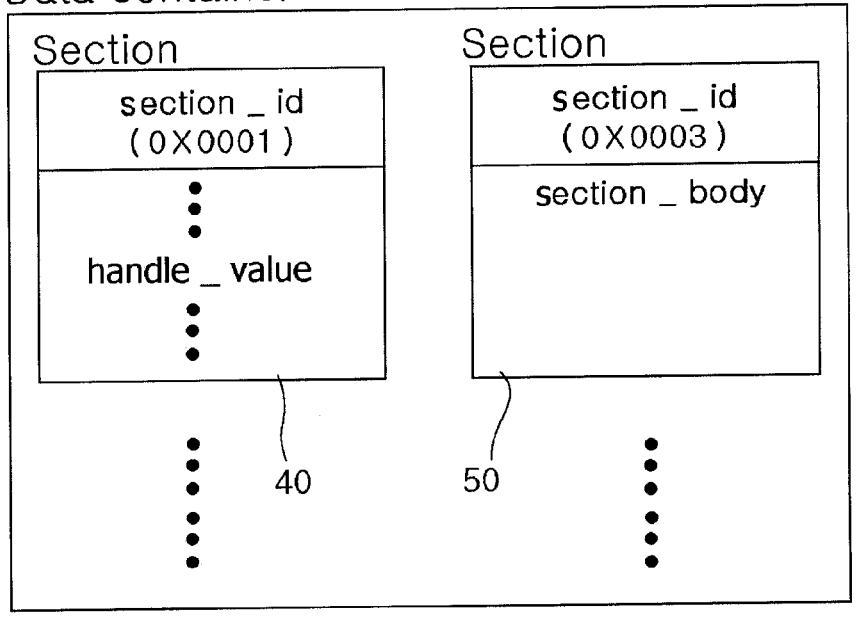
Figure 6:
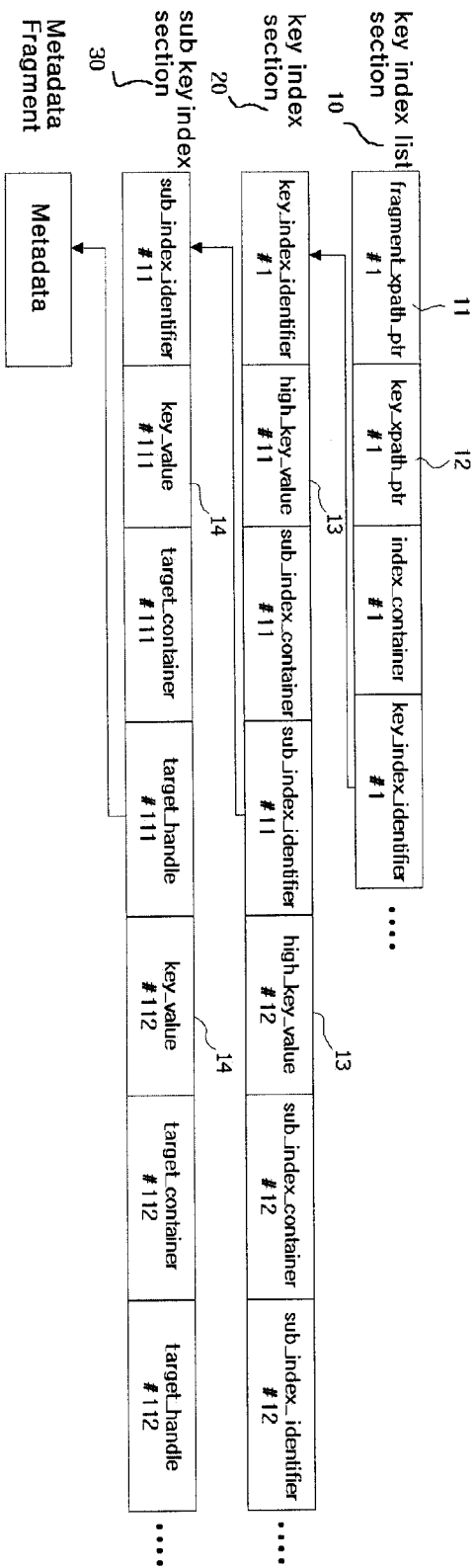
FIG. 6 is a block diagram illustrating an index structure of metadata using the conventional key scheme.

The step of extracting the concerned metadata, S1400, comprises the steps of searching for a representative key value meeting the search condition, in comparison of the representative key value and the range of values of the key of the search condition, in the key index (key_index) section 120, and searching the sub key index (sub_key_index) section 130 for a segment 114 including the values of the key in the range represented by the searched representative key value (S1410), searching for a value of the key meeting the search condition in the segment 114 of the searched sub key index (sub_key_index) section 130 (S1420), and extracting the concerned metadata by using the identification information of the metadata fragment corresponding to the searched value of the key, whereby the metadata fragment meeting the search condition is extracted. It is understood that, for example with reference to FIGS. 2 and 9, where a search condition corresponds to a key of 'Service Id' in the range of 507-514 is input, representative key values 509 and 519 are searched, values from the respective ranges of values of the key are searched, and fragments corresponding to the search condition are extracted by using the identification information on the fragments corresponding to the values of the key.

The location information of the fragment refers to an absolute path of the metadata fragment, the keys of which are to be indexed as described above, that is, the XPath of the metadata fragment (fragment_xpath_ptr), and the location information of the key refers to a relative path of the key for the metadata fragment (relative path in the XPath location of the fragment), that is, the XPath (key_descriptor) of the nodes used as keys.

In the steps of S1410, S1420 and S1430, the steps of searching the concerned key index (key_index) section 120 and the sub key index (sub_key_index) section 130, and extracting the concerned fragment proceed by use of the identification information of the key index (key_index) section 120, of the sub key index (sub_key-index) section and of the metadata fragment, respectively.

Figure 12:
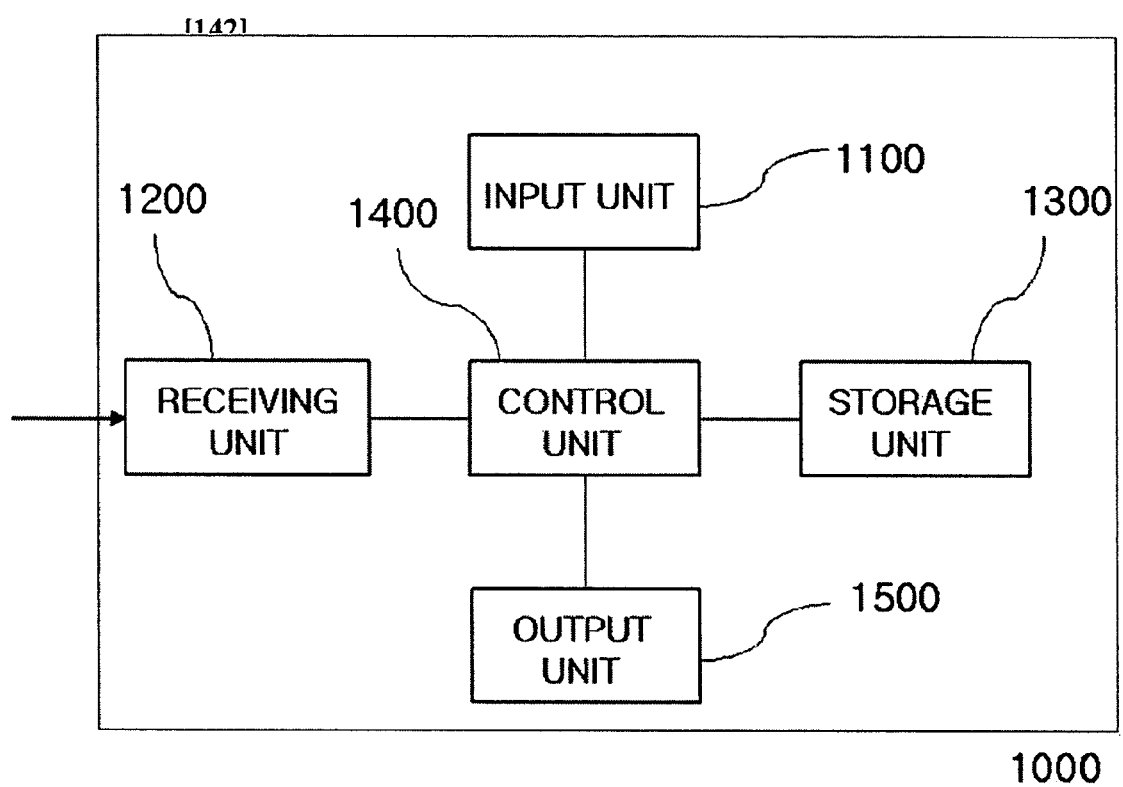
FIG. 12 is a schematic diagram illustrating an apparatus for searching for the metadata according to an embodiment of the present invention.

FIG. 12 depicts an apparatus for searching the metadata according to one embodiment of the present invention. The apparatus performs a method of searching the metadata according to the present invention described with reference to FIG. 11.

The apparatus 1000 comprises an input unit 1100 allowing a user to input a search condition, a receiving unit 1200 receiving contents, metadata on contents or an index of the metadata, a storage unit 1300 storing therein the received contents, the metadata on the contents or the index of the metadata, a control unit 1400 determining location information of the metadata corresponding to the field of the search condition input from the input unit 1100, searching the key containing the code predetermined as location information, where at least a part of the location information is defined as the predetermined code, and extracting the concerned metadata by use of the searched key, and an output unit 1500 outputting the result of the search by the control unit 1400.

The control unit 1400 compares the search condition input from the input unit 1100 with the value of the key contained in the metadata index stored in the storage unit 1300.

Among the steps of searching the metadata according to one embodiment of the present invention, the step of determining location information of the field of the input search condition within the metadata (S1210), the step of searching the key containing the code predetermined as location information, where at least a part of the location information is defined as the predetermined code (S1300), and the step of extracting the concerned metadata by use of the searched key (S1400) are performed in the control unit 1400. Descriptions of these steps have been described with reference to FIG. 11.

The present invention proposes an index structure providing a simplified indexing for metadata fragments to search the metadata fragments in a quick manner, under the environment wherein the metadata is structured on a fragment basis, a method for searching the index information, and an apparatus for searching the index information.

According to the present invention, a quick search of metadata is available and overhead to the apparatus for searching the metadata is reduced, thereby shortening the searching time and increasing the efficiency of the apparatus for searching the metadata. However, it is understood that while illustrative, non-limiting embodiments of the present invention overcome the above described disadvantages and other disadvantages not described above, the present invention is not required to overcome the disadvantages described above, and illustrative, non-limiting embodiments of the present invention may not overcome any of the problems described above. It is also understood that a system which uses the present invention also includes permanent or removable storage, such as magnetic and optical discs, RAM, ROM, a carrier wave medium, etc., on which the process and data structures of the present invention can be stored and distributed. The operations can also be distributed via, for example, downloading over a network such as the Internet.

Although the present invention has been described in connection with the exemplary embodiment shown in the drawings, it is merely illustrative. It will be understood to those skilled in the art that various modifications and equivalents can be made without departing from the scope and spirit of the invention. Therefore, the scope of the present invention should be defined only by the appended claims.

What is claimed is:

1. A method of searching for metadata divided into fragments and stored in a computer-readable storage medium, the method comprising:
    searching for and locating a key, by a processor, in an index having a list of keys corresponding to fields of the metadata and location information for defining the keys, wherein the key meets a search condition for a field of the metadata, wherein at least a part of the location information defining the key is expressed as a predetermined code value, wherein the predetermined code value is assigned to said at least a part of the location information according to a convention for associating codes with portions of the metadata and corresponds to a frequently used metadata fragment type, wherein the predetermined code value for ProgramInformation fragment is "1" and the predetermined code value for GroupInformation fragment is "2"; and
    extracting, by the processor, a fragment of the metadata from the computer-readable storage medium by using the located key.

2. The method as claimed in claim 1, wherein the searching for the key comprises:
    determining location information corresponding to the field of the metadata; and
    searching for the key corresponding to the determined location information corresponding to the field of the metadata.

3. The method as claimed in claim 1, wherein the extracting of the fragment comprises:
    searching for a value of the key meeting the search condition among values of the key from the index; and
    extracting the fragment of the metadata using identification information for the fragment corresponding to the value of the key.

4. The method as claimed in claim 3, wherein in response to a plurality of values of the key meeting the search condition, the extracting of the fragment comprises extracting ones of the fragments of the metadata corresponding to the values of the key meeting the search condition.

5. The method as claimed in claim 3, wherein the searching of the value comprises:
    searching for a representative key value meeting the search condition, among representative key values of the index corresponding to ranges of values of the key; and
    searching for the value among a range of values corresponding to the representative key value.

6. The method as claimed in claim 1, wherein the index comprises:
    a key index list section comprising the list;
    a sub-key index section comprising ranges of values of the key and identification information on ones of the fragments of the metadata corresponding to the values of the key; and
    a key index section comprising representative key values representing the respective ranges of values of the key.

7. The method as claimed in claim 1, wherein the location information comprises location information of the extracted fragment of the metadata which includes the key, and location information of the key within the extracted fragment.

8. A method of searching for metadata divided into fragments and stored in a computer-readable storage medium, the method comprising:
    accessing, by a processor, a list comprising a plurality of combinations of location information of a fragment and location information defining at least one key within the fragment, wherein one of the location information of the fragment and the location information defining the at least one key is expressed as a predetermined code, wherein the predetermined code is assigned to said one of the location information of the fragment and the location information defining the at least one key according to a convention for associating codes with portions of the metadata and corresponds to a frequently used metadata fragment type, wherein the predetermined code value for ProgramInformation fragment is "1" and the predetermined code value for GroupInformation fragment is "2";

searching, by the processor, the list and locating among the plurality of combinations a combination in which at least one key of the metadata meets a search condition; and extracting one or more fragments of the metadata corresponding to the located combination.

9. The method as claimed in claim 8, wherein one of the location information of the fragment and the location information defining the at least one key is expressed as another predetermined code or an XPath expression.

10. A computer-readable storage medium comprising computer-executable instructions for performing said searching for and locating a key in the index and said extracting a fragment of the metadata recited in claim 1.

11. A computer-readable storage medium comprising computer-executable instructions for performing searching the list and extracting one or more fragments of the metadata recited in claim 8.

12. An apparatus for searching for metadata divided into fragments, comprising:
a central processing unit (CPU);
an input unit receiving a search condition having a field of the metadata as a search parameter; and
a control unit using the CPU to search an index of the metadata, the index having a list of keys corresponding to fields of the metadata and location information for defining the keys, for a key corresponding to the search condition, wherein at least a part of the location information defining the key is expressed as a predetermined code value, and extracting a fragment of the metadata using the searched key, wherein the predetermined code value is assigned to said at least a part of the location information according to a convention for associating codes with portions of the metadata and corresponds to a frequently used metadata fragment type, wherein the predetermined code value for ProgramInformation fragment is "1" and the predetermined code value for GroupInformation fragment is "2".

13. The apparatus as claimed in claim 12, wherein the location information comprises location information of a fragment of the metadata including the key, and location information of the key within the fragment.

14. The apparatus as claimed in claim 13, wherein one of the location information of the fragment and the location information of the key is expressed as the predetermined code value.

15. The apparatus as claimed in claim 14, wherein one of the location information of the fragment and the location information of the key is expressed as another predetermined code value or an XPath expression.

16. The apparatus as claimed in claim 14, wherein the predetermined code value comprises XPath as additional information, wherein the location information of one of the fragment and the key expressed as a predetermined code corresponds to a user defined type.

17. The apparatus as claimed in claim 12, wherein the control unit searches a value of the key meeting the search condition among values of the key from the index, and extracts identification information of the fragment of the metadata corresponding to the value of the key meeting the search condition.

18. The apparatus as claimed in claim 17, wherein in response to a plurality of values of the key meeting the search condition, the control unit extracts ones of the fragments of the metadata corresponding to the values of the key meeting the search condition.

19. The apparatus as claimed in claim 17, wherein the control unit searches for a representative key value meeting the search condition, among representative key values of the index corresponding to ranges of values of the key, and searches for the value among a range of values corresponding to the representative key value.

20. The apparatus as claimed in claim 12, further comprising:
a receiving unit receiving the metadata;
a storage unit storing therein the received metadata; and
an output unit outputting the search result by the control unit.

21. The apparatus as claimed in claim 12, wherein the metadata has a structure of metadata as defined by the TV-Anytime Forum.

22. The apparatus as claimed in claim 12, wherein the index comprises:
a key index list section comprising the list;
a sub-key index section comprising ranges of values of the key and identification information on ones of the fragments of the metadata corresponding to the values of the key; and
a key index section comprising representative key values representing the respective ranges of values of the key.

23. An apparatus for searching for metadata divided into fragments, comprising:
a central processing unit (CPU);
an input unit receiving a search condition for at least one key of the metadata; and
a control unit using the CPU to select from a list comprising a plurality of combinations of location information of a fragment and location information defining at least one key within the fragment, a combination corresponding to the search condition, wherein one of the location information of the fragment and the location information defining the at least one key is expressed as a predetermined code, wherein the predetermined code is assigned to said one of the location information of the fragment and the location information defining the at least one key according to a convention for associating codes with portions of the metadata and corresponds to a frequently used metadata fragment type, wherein the predetermined code value for ProgramInformation fragment is "1" and the predetermined code value for GroupInformation fragment is "2".

24. The apparatus as claimed in claim 23, wherein one of the location information of the fragment and the location information defining the at least one key is expressed as another predetermined code or an XPath expression.

25. The apparatus as claimed in claim 23, wherein the control unit extracts one or more fragments of the metadata corresponding to identification information of the metadata identified by the selected combination.

26. The method as claimed in claim 1, wherein the frequently used metadata fragment type is a TV Anytime metadata fragment type.

* * * * *